United States Patent
Zhang et al.

(10) Patent No.: US 11,115,494 B1
(45) Date of Patent: Sep. 7, 2021

(54) PROFILE CLUSTERING FOR HOMOGENOUS INSTANCE ANALYSIS

(71) Applicant: International Business Machines Corporation, Armonk, NY (US)

(72) Inventors: Yi Xuan Zhang, Zhangjiang (CN); Qi Liang, Shanghai (CN); Gui Yu Jiang, Shanghai (CN); Chao Jun Wei, Beijing (CN); Yu Zhuo Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/801,435

(22) Filed: Feb. 26, 2020

(51) Int. Cl.
*H04L 29/08* (2006.01)

(52) U.S. Cl.
CPC ............ *H04L 67/306* (2013.01); *H04L 67/10* (2013.01)

(58) Field of Classification Search
CPC .............................. H04L 67/10; H04L 67/306
See application file for complete search history.

(56) References Cited

U.S. PATENT DOCUMENTS

| | | | | |
|---|---|---|---|---|
| 6,988,263 B1* | 1/2006 | Hussain | ................. | G06F 11/323 |
| | | | | 714/E11.181 |
| 7,574,587 B2* | 8/2009 | DeWitt, Jr. | ......... | G06F 9/30181 |
| | | | | 700/78 |
| 7,765,094 B2 | 7/2010 | Bodden et al. | | |
| 10,044,729 B1* | 8/2018 | Astakhova | ............... | H04W 4/21 |
| 10,133,602 B2* | 11/2018 | Harris | ................... | G06F 9/4856 |
| 10,871,976 B2* | 12/2020 | Yi | ........................ | G06F 9/45508 |
| 2009/0113246 A1* | 4/2009 | Sabato | ................ | G06F 11/0706 |
| | | | | 714/37 |
| 2009/0177642 A1* | 7/2009 | Chung | ................ | G06F 11/3466 |
| 2011/0173199 A1* | 7/2011 | Heisig | ................. | G06F 11/3452 |
| | | | | 707/737 |
| 2013/0275990 A1 | 10/2013 | Koutyrine et al. | | |
| 2014/0245446 A1 | 8/2014 | Shanmugavelayutham et al. | | |
| 2016/0092363 A1* | 3/2016 | Wang | .................... | G06F 1/3206 |
| | | | | 711/119 |
| 2016/0246647 A1* | 8/2016 | Harris | .................... | G06F 9/5027 |
| 2016/0359683 A1* | 12/2016 | Bartfai-Walcott | .......................... | |
| | | | | H04L 41/5009 |
| 2017/0116415 A1 | 4/2017 | Stopel et al. | | |
| 2017/0249141 A1 | 8/2017 | Parees et al. | | |
| 2019/0171811 A1 | 6/2019 | Daniel et al. | | |
| 2019/0220319 A1 | 7/2019 | Parees et al. | | |

FOREIGN PATENT DOCUMENTS

| | | | | | |
|---|---|---|---|---|---|
| EP | | 1308844 A2 * | 5/2003 | .......... | G06F 11/3409 |
| WO | WO-2004107177 A2 * | | 12/2004 | .......... | G06F 8/4442 |

* cited by examiner

*Primary Examiner* — Kostas J Katsikis
(74) *Attorney, Agent, or Firm* — Cantor Colburn LLP; Teddi Maranzano (57) ABSTRACT

Techniques for profile clustering for homogenous instance analysis are described herein. An aspect includes collecting for each of a plurality of homogenous instances in a cloud computing environment, respective profiling information, the profiling information comprising counter data. Another aspect includes identifying a code unit for analysis. Another aspect includes aggregating counters corresponding to the code unit for each of the plurality of homogenous instances from the respective profiling information. Another aspect includes determining a cluster comprising a subset of the plurality of homogenous instances based on the aggregated counters.

17 Claims, 8 Drawing Sheets

| CON-TAINER | MODULE | SOURCE FILE | FUNCTION | SOURCE LINE | OFFSET | TICKS | SUM TICKS |
|---|---|---|---|---|---|---|---|
| C1 | M1 | INSERT.C | F1 | 105<br>110 | 0X100<br>0X130 | 300<br>600 | 900 |
|  |  | UPDATE.C | F2 | 206<br>208 | 0X200<br>0X220 | 1200<br>800 | 2000 |
| C2 | M1 | INSERT.C | F1 | 105<br>110 | 0X100<br>0X130 | 250<br>750 | 1000 |
|  |  | UPDATE.C | F2 | 206<br>208 | 0X200<br>0X220 | 1250<br>750 | 2000 |
| ... |  |  |  |  |  |  |  |
| C100 | M1 | INSERT.C | F1 | 106<br>111 | 0X100<br>0X130 | 600<br>1200 | 1800 |
|  |  | UPDATE.C | F2 | 203<br>205 | 0X200<br>0X220 | 320<br>480 | 800 |

PROFILE CLUSTERING FOR HOMOGENOUS INSTANCE ANALYSIS

BACKGROUND

The present invention generally relates to computer systems, and more specifically, to profile clustering for homogenous instance analysis for use in conjunction with a computer system.

System operation status in a computer system can be monitored by a hardware performance counter during system operation, and related events can be recorded into a system log file. Up to hundreds of events can be monitored and recorded, including ticks, instruction cache miss (i-cache miss), data cache miss (d-cache miss), branch miss, etc. Those events can be counted continuously by performance counters. For example, it is conceivable to monitor a system by a performance counter at regular intervals to find out what instructions are running and record the addresses of those instructions. Once an instruction is monitored as running, tick count of this instruction is increased by 1. The above monitoring can be repeated during a predetermined period of time, such as one hour, and the counts of the event that the identical instruction is running can be summed up to get a sum of the ticks. Similarly, other events can be counted, and the corresponding addresses can be recorded. Based upon the records about the above events in system log files, a system performance analysis tool can form a sorted list. System performance deficiencies or bottlenecks can be found out through further analyzing such a sorted list. For instance, hotspots, i.e., instructions executed at a relatively high frequency, corresponding functions, modules, etc, can be identified through ordering instruction ticks within the sorted list.

SUMMARY

Embodiments of the present invention are directed to profile clustering for homogenous instance analysis. A non-limiting example computer-implemented method includes collecting for each of a plurality of homogenous instances in a cloud computing environment, respective profiling information, the profiling information comprising counter data. The method also includes identifying a code unit for analysis. The method also includes aggregating counters corresponding to the code unit for each of the plurality of homogenous instances from the respective profiling information. The method also includes determining a cluster comprising a subset of the plurality of homogenous instances based on the aggregated counters.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide profile clustering for homogenous instance analysis. Homogenous instances are widely used in cloud environments. For example, a number of containers may be instantiated from the same docker image, Spark™ tasks from the same Spark application, or serverless applications from the same function code. Homogenous instances are supposed to have similar behavior and performance; however, during execution, behavior and performance may vary among homogenous instances due to, for example, resource competition, unbalanced workload input, and underlying software, hardware, and/or network configurations. Analysis of the runtime patterns of homogenous instances may be performed to determine any correlation between container performance and hosting environment or workload input, and correct any identified issues with a homogenous instance (e.g., relatively slow response times).

Runtime patterns of a relatively large number of homogenous instances with respect to a particular code unit may be analyzed based on profile clustering based on performance counter data. In some embodiments, profile clustering may be performed based on any appropriate counter data that is collected by an operating system, including but not limited to ticks and cache misses, such as instruction cache misses, data cache misses, and/or branch misses. In some embodiments, profile clustering may include analysis based on module or function ticks, source file ticks, and/or pods ticks in Kubernetes™ cluster. Profiling may enable analysis of the processes inside a container with respect to a selected code unit, e.g., a particular function or module that may be experiencing performance issues. Embodiments of profiling information for each of a set of homogenous instances may include addresses and offsets, which gives the location of sampled code (e.g., particular instructions), and associated tick data, which indicates a number of times the code was sampled. The effective address of sampled code may be mapped to a particular module, function, or source file. Embodiments of profiling information may include a number of times an event (e.g., a cache miss) occurred, associated with a location in the code that caused the event. Profiling information may be gathered for all homogenous instances in a cloud computing environment, and profiles collected from different hosts or machines may be consolidated.

A profiling tool may determine profiling data for any number of homogenous instances. The profiling information may include counters (e.g., ticks), effective addresses, and process identifiers (IDs) of sampled code. Addresses of sampled code may be mapped to particular modules or functions. Source file and source line numbers corresponding to ticks may also be collected. Profiling data may be consolidated by looking up the code unit that is being analyzed with an address and process ID from a map. Depending on analysis requirements, code units on multiple different levels can be extracted or aggregated from all of the profiles corresponding to a set of homogenous instances. If a code unit has hierarchy, lower-level code units may be considered as attributes of a higher-level code unit, and counters may be aggregated on all levels of the code unit in order to determine hotness by object (e.g., frequency of execution of an object corresponding to the code unit). If an address maps to an offset in the code unit, counters may be aggregated based on offset, and hotness may be determined based on lines in the code unit (e.g., frequency of execution of an instruction corresponding to a line in the code unit; each point on hotness by line is an offset in the code unit and its ticks). One or more code units may be selected for analysis, and profiles may be clustered based on hotness of objects or lines associated with the one or more code units. The clustering can be performed on multiple levels, for example, at finer granularity (e.g., function level), or coarser granularity (e.g., component level, or a set of source files for one specific functionality). Remedial action may be taken for existing homogenous instances, or deployment strategies may be determined for future homogenous instances, based on the clustering.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
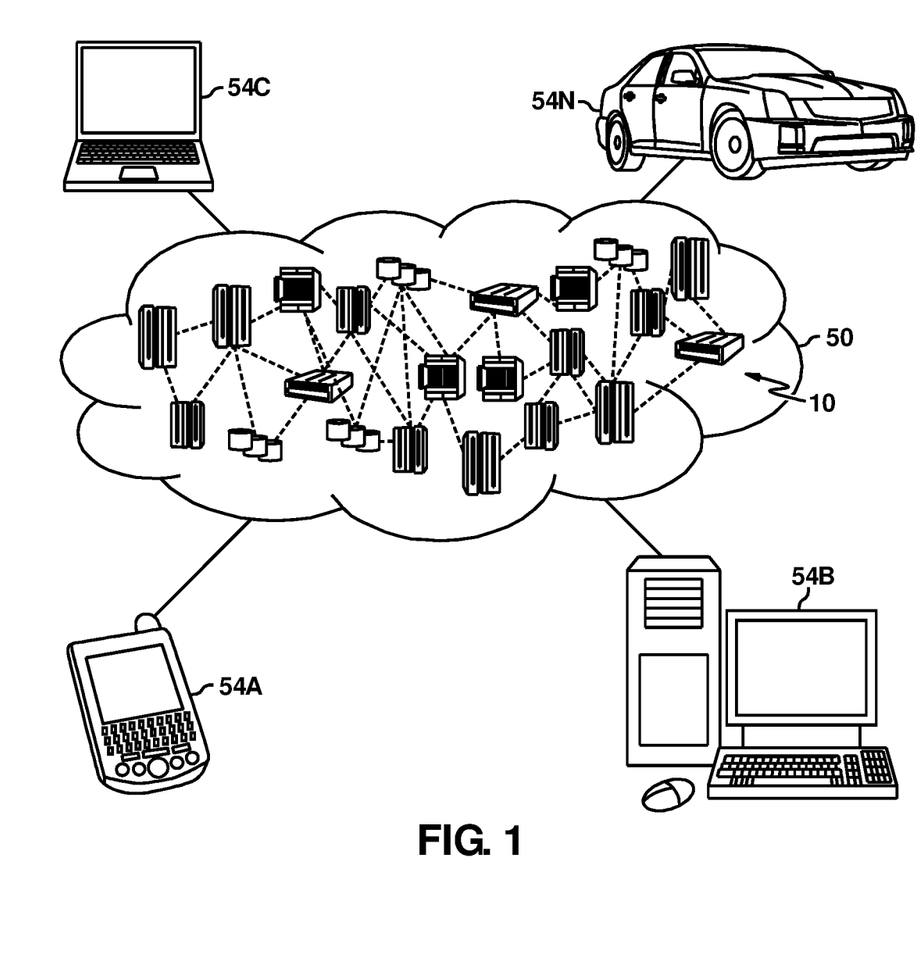
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
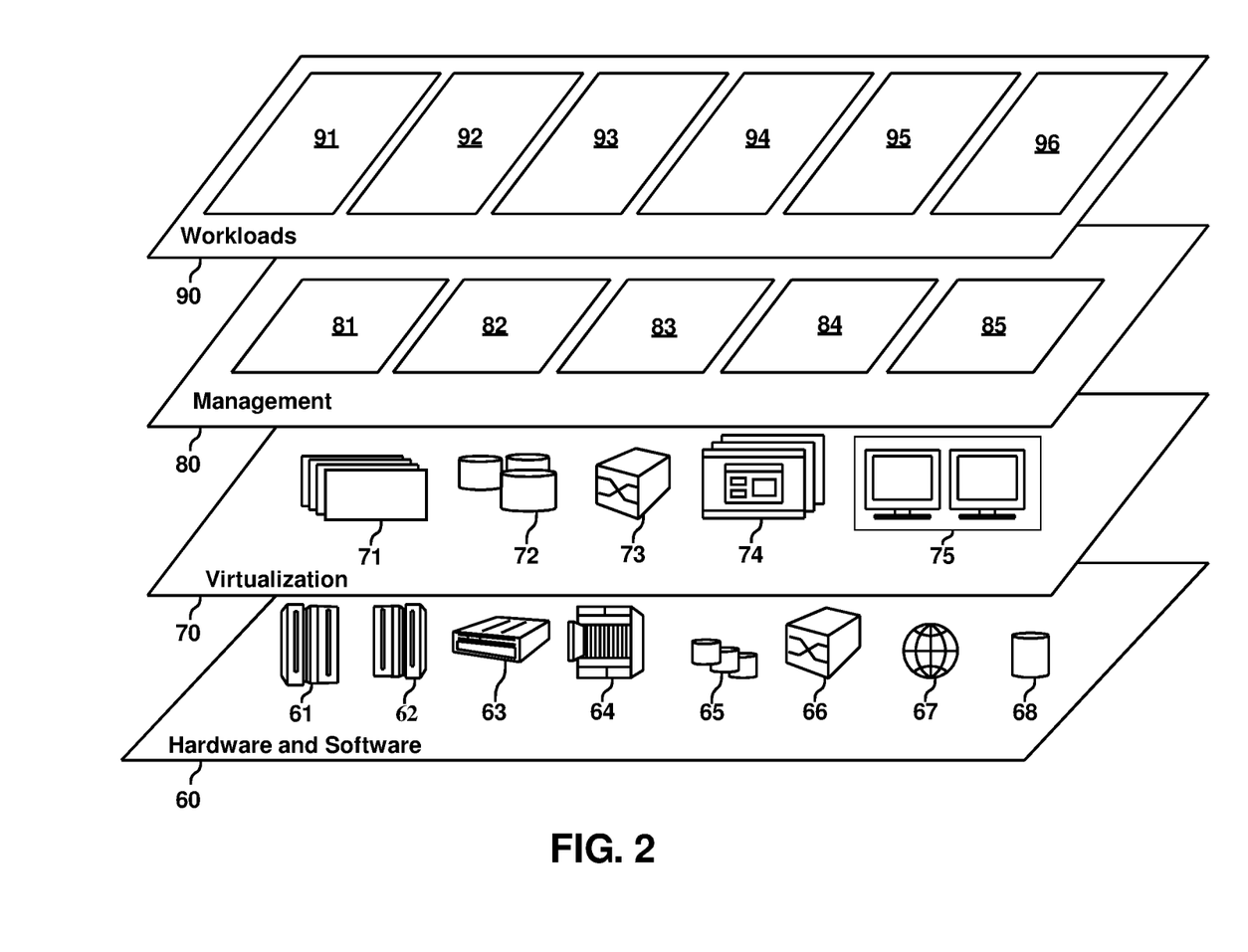
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and structured query language (SQL) modules 96.

Figure 3:
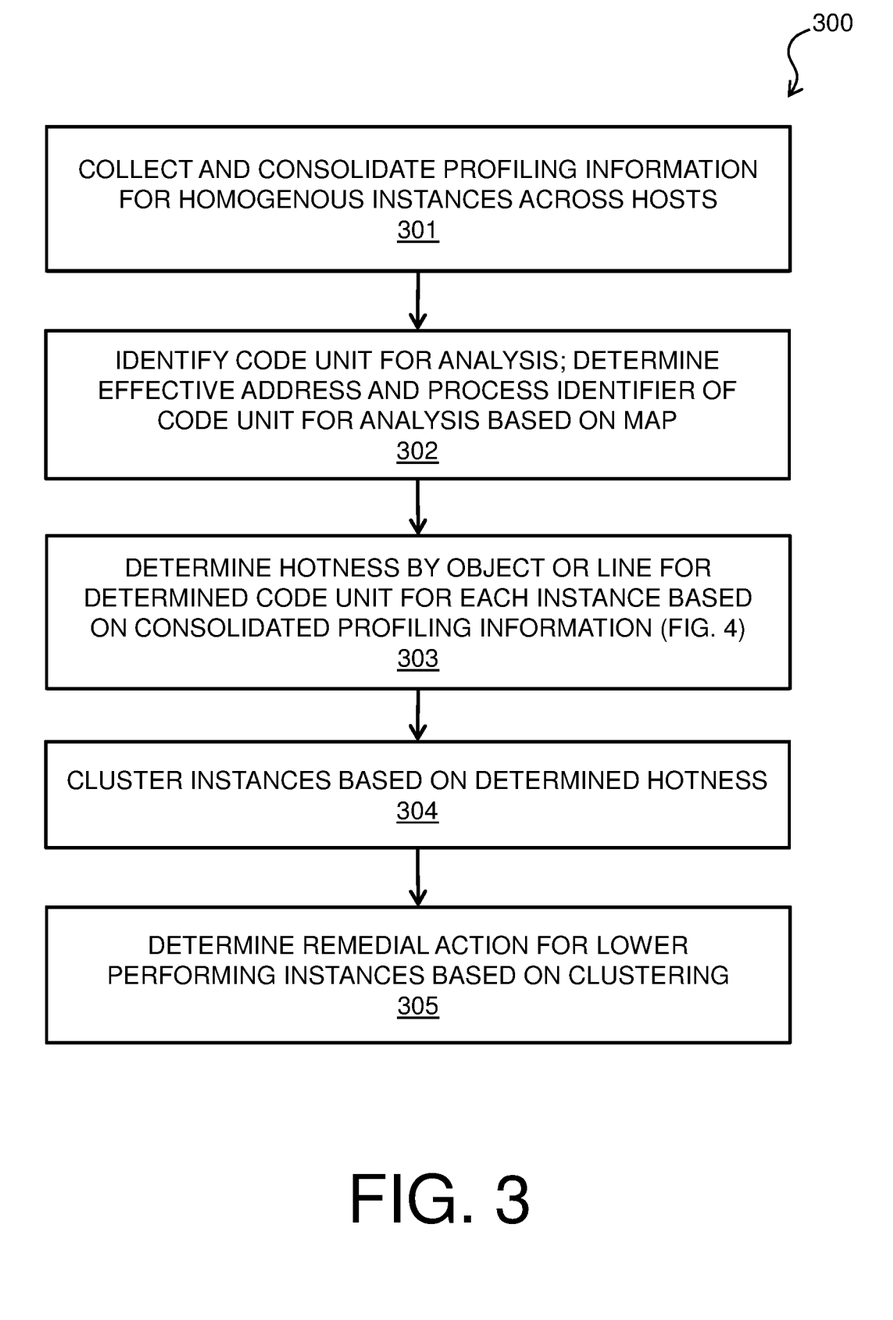
FIG. 3 is a flow diagram of a process for profile clustering for homogenous instance analysis in accordance with one or more embodiments of the present invention.

FIG. 3 shows a process flow diagram of a method 300 for profile clustering for homogenous instance analysis in accordance with one or more embodiments of the present invention. Method 300 may be implemented in conjunction with management layer 80 in the cloud computing environment of FIG. 2 in some embodiments, and clustering information that is determined based on method 300 may be used to assign homogenous instances, such as containers, to particular elements of hardware and software layer 60 by virtualization layer 70, and also to schedule new homogenous instances in the cloud computing environment. Method 300 may be implemented in conjunction with any appropriate computer device, such as computer system 600 of FIG. 6. In block 301 of method 300, profiling information is determined for a set of homogenous instances that are hosted in a cloud computing environment by a profiling tool. The profiling information may be gathered and consolidated across different hosts or machines in the cloud computing environment in block 301. The gathering and consolidating of the profiling information may be performed by a profiling tool in some embodiments. The homogenous instances for which the profiling information is collected in block 301 may have all been instantiated from the same image, and may use the same underlying software, but may be hosted on different hardware, network, and/or software configurations, and may process different workloads during operation. The profiling information that is collected in block 301 may be collected across any appropriate number of hosts, and may include any appropriate information, including but not limited to counter data associated with effective addresses, process IDs, modules, functions, source files, offsets, and/or source lines for sampled code that was executed and logged during operation of the containers. In some embodiments, the profiling information that is collected in block 301 may have been generated by periodically sampling the code that is currently being executed by an instance during operation, and recording an identifier (i.e. effective address and process identifier) of the sampled code, a number of times the code has been sampled (i.e., ticks), and a map of the effective address of the sampled code to an offset, a module, a function, and/or a source file. The tick data may have been generated by sampling the code that is being executed by an instance at regular intervals (e.g., every 100 milliseconds), and incrementing a tick count corresponding to the sampled code (e.g., an instruction) in a log corresponding to the instance. In some embodiments, the profiling information that is gathered in block 301 may include any appropriate counter data, including but not limited to instruction cache miss data, data cache miss data, and/or branch miss data. The cache miss counter data may be associated with effective addresses and process identifiers, and may be aggregated and handled in the same or similar manner as tick data in various embodiments. For example, each time an instruction cache miss occurs during execution of software by the operating system, the operating system may increase a count corresponding to the instruction cache miss based on the effective address and process identifier of the code that caused the instruction cache miss. Example embodiments of maps that may be gathered by a profiling tool in block 301 are illustrated with respect to FIG. 5B, which are discussed below.

In block 302, a code unit for analysis is identified. The code unit for analysis may be any appropriate module(s) of computer code (for example, the code unit may correspond to an operation or function that is executing relatively slowly for a particular customer), and may correspond to a module or function that is executed by each of the homogenous containers in various embodiments. In some embodiments, the code unit under analysis may be a module or function that is frequently performed, such as insert or update for a container that is performing database functions (e.g., inserting, updating, or retrieving data from a database). A code unit for analysis that is identified in block 302 may include, but is not limited to, a portion of a library (such as .lib or .so), a compression tool, a dynamic link library (dll), or one or more java packages. An effective address and process ID corresponding to the code unit for analysis may be determined in block 302 based on the map that was generated by the profiling tool in block 301. Embodiments of a map that is generated by a profiling tool and is used to determine the effective address and process ID in block 302 may include a map that associates address ranges and process IDs to functions, associates address ranges and process IDs to modules, or associates address ranges and process IDs to modules and functions.

In block 303, hotness by object or hotness by line is determined for the code unit for each instance of the set of homogenous instances. The hotness by object or hotness by line of the code unit may be determined based on aggregation of counter data corresponding to the code unit from the consolidated profiling information. The counter data may be aggregated at any appropriate number of levels of code in various embodiments in block 303. Data corresponding to the code unit under analysis may be extracted and analyzed in block 303 based on looking up a determined effective address and process identifier of the code unit in the map of the consolidated profiling information. An embodiment of extracted tick data from consolidated profiling information is illustrated with respect to FIG. 5A, which is discussed below. Block 303 is discussed in further detail below with respect to method 400 of FIG. 4.

In block 304, the container profiles are clustered based on the determined hotness by object or hotness by line that was determined in block 303. In some embodiments, K-means clustering may be used for hotness by object clustering in block 304, and dynamic time warping (DTW) clustering may be used for hotness by line clustering in block 304. An example of clustering, such as may be performed in block 304, is illustrated with respect to FIG. 5C, which is discussed below. Any correlations between instance performance and hosting environment and/or workload input may be determined based on the clustering.

In block 305, remedial action is determined for lower-performing instances based on the clustering. For example, the clustering may determine a group of instances with higher CPU usage and/or higher I/O usage. In some embodiments, remedial action may include moving containers that are part of a particular cluster to a different host having appropriate hardware capabilities in the cloud computing environment (e.g., additional CPU and/or I/O resources). Further, in block 305, a strategy (e.g., a recommended specification for hosts) may be determined for new homogenous instances that may be instantiated in the future. For example, a new homogenous container may be scheduled on a particular machine based on the clustering and the anticipated workload of the container.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
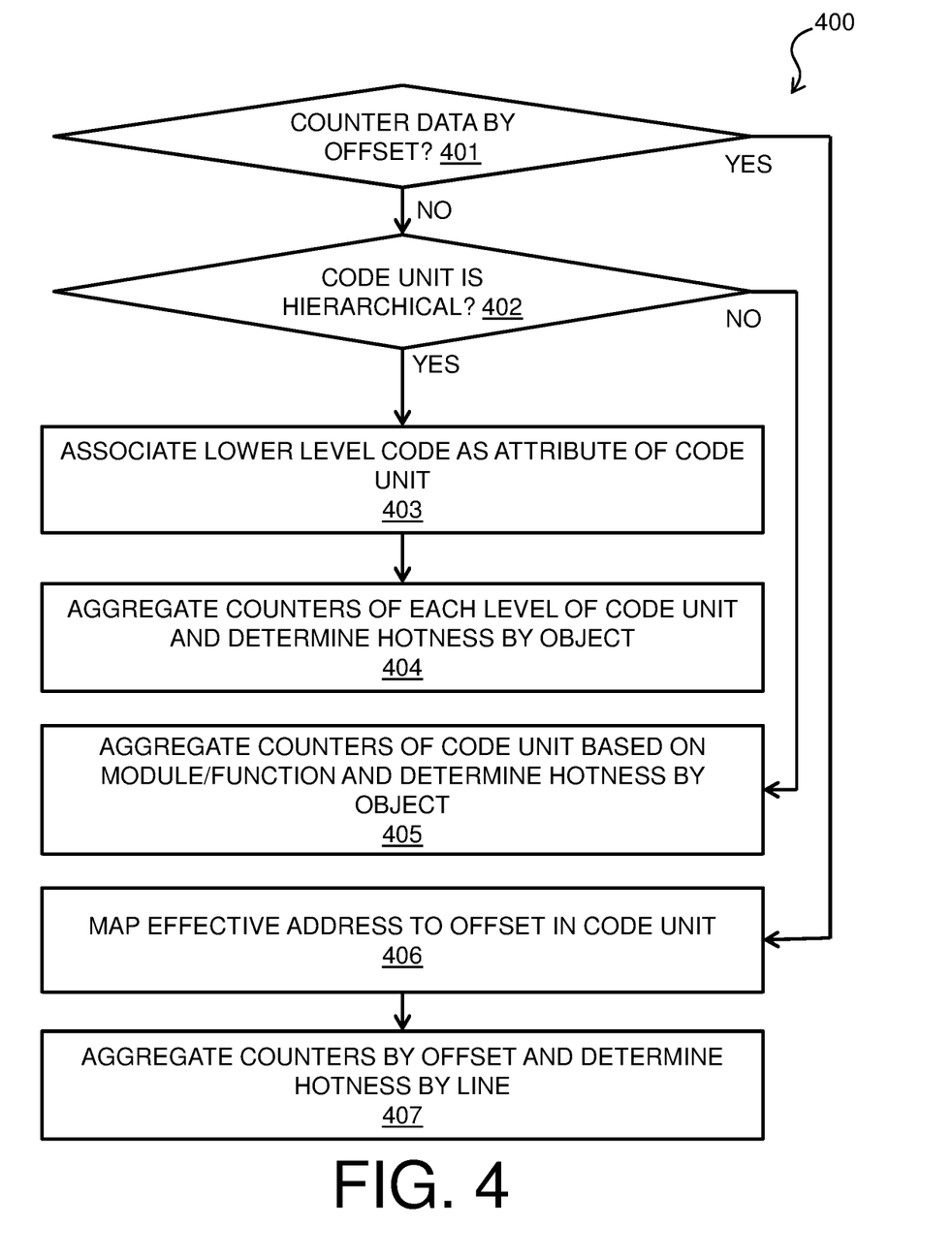
FIG. 4 is a flow diagram of a process for hotness determination for profile clustering for homogenous instance analysis in accordance with one or more embodiments of the present invention.

FIG. 4 shows a process flow diagram of a method 400 for hotness determination for profile clustering for homogenous instance analysis in accordance with one or more embodiments of the present invention. Method 400 may be performed in block 303 of method 300 of FIG. 3. In block 401, it is determined whether to aggregate the counter data by offset or by module/function. The determination of block 401 may be made based on the data that is available in the consolidated profiling data, and also based on a type of analysis that is appropriate for the code unit. The determination of block 401 may be made by, for example, an administrator of the cloud computing environment in some embodiments. If it is determined in block 401 that counter data will not be aggregated by offset, flow proceeds from block 401 to block 402. In block 402, it is determined whether the code unit is hierarchical. The determination of block 402 may be based on the map that was generated by the profiling tool. For example, the code unit may be determined to be hierarchical if the map includes one or more modules and associated functions. An example of a map that indicates a hierarchical code unit (e.g., module) is illustrated below with respect to map 501 of FIG. 5B. Examples of maps that indicate a non-hierarchical code unit (e.g., module or function) are illustrated below with respect to map 502 and map 503 of FIG. 5B. If it is determined in block 402 that the code unit is hierarchical, flow proceeds from block 402 to block 403. In block 403, any lower-level code units are associated as attributes of the higher-level code unit. For example, any functions may be associated with an upper-level module corresponding to the code unit in block 403. In block 404, counter data is aggregated across all levels (e.g., both functions and upper-level module) of the code unit from the consolidated profiling data to determine hotness by object of the code unit. The counter data that is aggregated in block 404 may include, but is not limited to, ticks or cache misses in various embodiments.

If it was determined in block 402 that the code unit is not hierarchical, flow proceeds from block 402 to block 405. In block 405, the counters are aggregated from the consolidated profiling data across the non-hierarchical module or function corresponding to the code unit, and the hotness by object is determined based on the aggregated counters of the code unit. The counter data that is aggregated in block 405 may include, but is not limited to, ticks or cache misses in various embodiments.

If it was determined in block 401 to aggregate counter data by offset, flow proceeds from block 401 to block 406. In block 406, the effective address corresponding to the code unit is mapped to an offset in the consolidated profiling data. In block 407, the counters are aggregated from the consolidated profiling data based on the offset, and hotness by line is determined for the code unit based on the aggregated counters. The counter data that is aggregated in block 407 may include, but is not limited to, ticks or cache misses in various embodiments.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

In an example embodiment of method 300 of FIG. 3, the homogenous instances may include a platform as a service (PaaS) MySQL™ service that is provided by multiple MySQL containers in a cloud computing environment. The containers may have no obvious differences from an infrastructure perspective, such as hosting machines, network configuration, etc. However, a particular customer may experience relatively long response times on SQL updates using the customer's assigned container, while other customers do not have such problems. Profile clustering for homogenous instance analysis may be used to determine a root cause of the observed relatively long response times for SQL updates for the particular customer. Profiling information may be collected from any homogenous instances comprising MySQL containers in the cloud computing environment in block 301. For example, profiling information may be determined for 100 containers running the same MySQL image; an example of such profiling information is illustrated with respect to FIG. 5A.

Figure 5A:
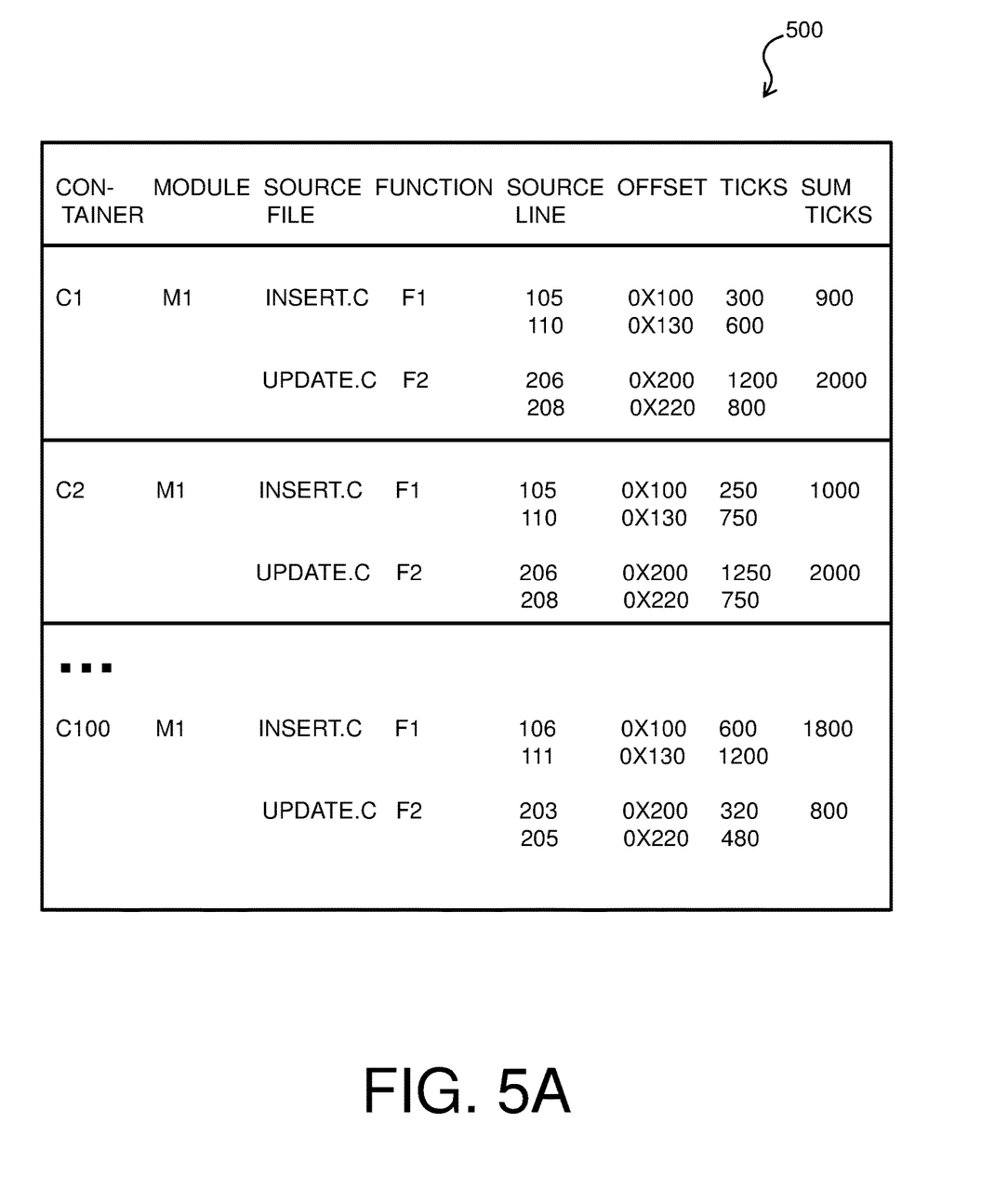
FIG. 5A is a graph of profiling information for use in conjunction with embodiments of profile clustering for homogenous instance analysis in accordance with one or more embodiments of the present invention.

FIG. 5A illustrates an embodiment of profiling information 500 comprising tick data that may be used in conjunction with embodiments of profile clustering for homogenous instance analysis in accordance with one or more embodiments of the present invention. Profiling information 500 shows profiling information for three homogenous containers, i.e., C1, C2, and C100, which may be collected and consolidated in block 301 of FIG. 3. Each includes tick data for code units insert.c and update.c. As shown in profiling information 500, containers C1 and C2 have relatively low ticks for insert.c and relatively high ticks for update.c, while container C100 has relatively high ticks for insert.c and relatively low ticks for update.c. Tick data is included at the source line/offset and function level in profiling information 500.

The code unit for analysis in embodiments corresponding to FIG. 5A in block 302 may be an SQL I/O function (e.g., libmysql.so). In block 303 of FIG. 3, method 400 of FIG. 4 is invoked. In an embodiment, it may be determined in block 401 to aggregate tick data by module/function for libmysql.so. In block 402, libmysql.so may be determined to be hierarchical, including sub-modules insert.c and update.c. In block 403, the sub-modules insert.c and update.c are associated with the upper-level module libmysql.so. In block 404, ticks are aggregated for each of insert.c and update.c, and also for the overall upper level module. Therefore, based on profiling information 500, for container C1, it may be determined that, for the overall libmysql.so, there are 2900 ticks; for insert.c, there are 900 ticks; and for update.c, there are 2000 ticks. Ticks may be determined for each module for each container, and containers may be clustered into groups displaying similar performance patterns in block 304 based on the aggregated tick data.

In another embodiment, it may be determined in block 401 to aggregate tick data by module/function for libmysql.so, but it may be determined in block 402 that the code unit is not hierarchical, or that hierarchical analysis is not necessary. Therefore, in block 405, based on profiling information 500, for container C1, it may be determined that for libmysql.so there are 2900 ticks. Ticks may be determined for the non-hierarchical code unit for each container, and containers may be clustered into groups displaying similar performance patterns in block 304 based on the aggregated tick data.

In another embodiment, it may be determined in block 401 to aggregate the tick data by offset. In such an embodiment, in block 406, an effective address of the code unit may be mapped to an offset of the code unit, and tick data may be extracted from the profiling information based on the offset. In block 407, ticks may be aggregated by each offset (e.g., line number) corresponding to the code unit, and clustering may be performed in block 304 based on the hotness by line.

In an example embodiment, containers may be clustered in block 304 of method 300 based on respective ticks of insert.c and update.c. For example, a first cluster may include containers having higher insert ticks and lower update ticks, while a second cluster may include containers having lower insert ticks and higher update ticks. An example of clustering is illustrated with respect to FIG. 5C. Remedial action may be determined for a particular customer's container based on the clustering in block 305.

Figure 5B:
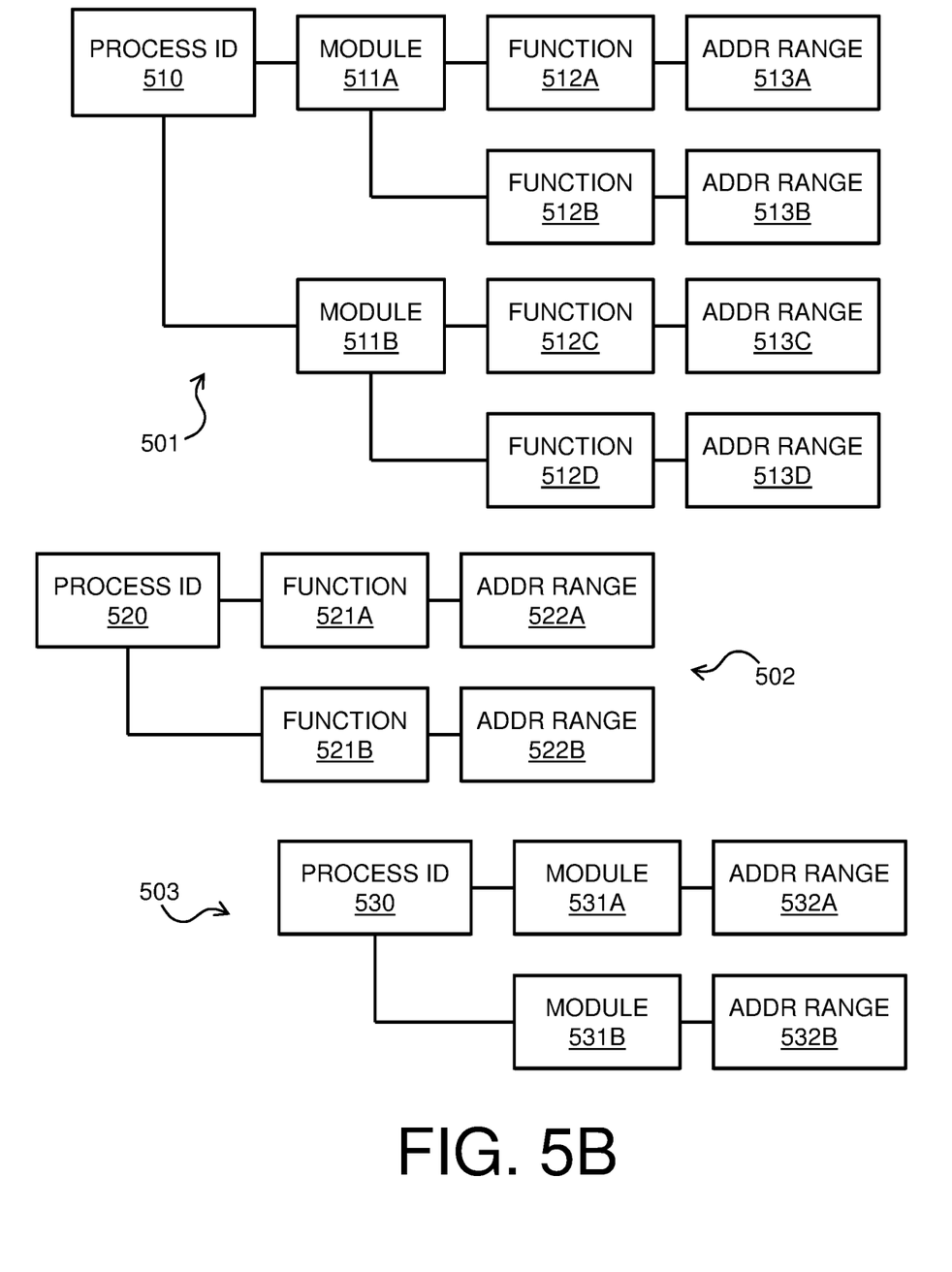
FIG. 5B is a block diagram of examples of maps for use in conjunction with one or more embodiments of profile clustering for homogenous instance analysis.

FIG. 5B illustrates embodiments of maps 501, 502, and 503 that may be used in conjunction with profile clustering for homogenous instance analysis in accordance with one or more embodiments of the present invention. Map 501 gives associations from process IDs, such as process ID 510, and address ranges 513A to modules 511A and functions 512A. Map 502 gives associations from process IDs, such as process ID 520, and address ranges 522A to functions 521A. Map 503 gives associations from process IDs, such as process ID 530, and address ranges 532A to modules 531A. Process ID and effective address range information may be used to determine a code unit (e.g., a module or function) based on a maps such as maps 501-503. A map such as map 501 may indicate in block 402 of FIG. 4 that a module (e.g., module 511A) is hierarchical. A map such as map 502 or map 503 may indicate in block 402 of FIG. 4 that the functions/modules are not hierarchical.

Embodiments of a map such as maps 501, 502, and 503 may be used to look up any module or function based on process ID and instruction address. A process ID and instruction address may be determined based on samples corresponding to the code unit for analysis in block 302 of method 300. The source file name or source line number may be available from side products of compilation, such as listing files, which may be included with the map. A source file name or source line number may be looked up in the same manner as the module or function. A sampled instruction address e.g., corresponding to a tick) may be an effective address in the virtual address space of the operating system, in which every process has its own address space.

Figure 5C:
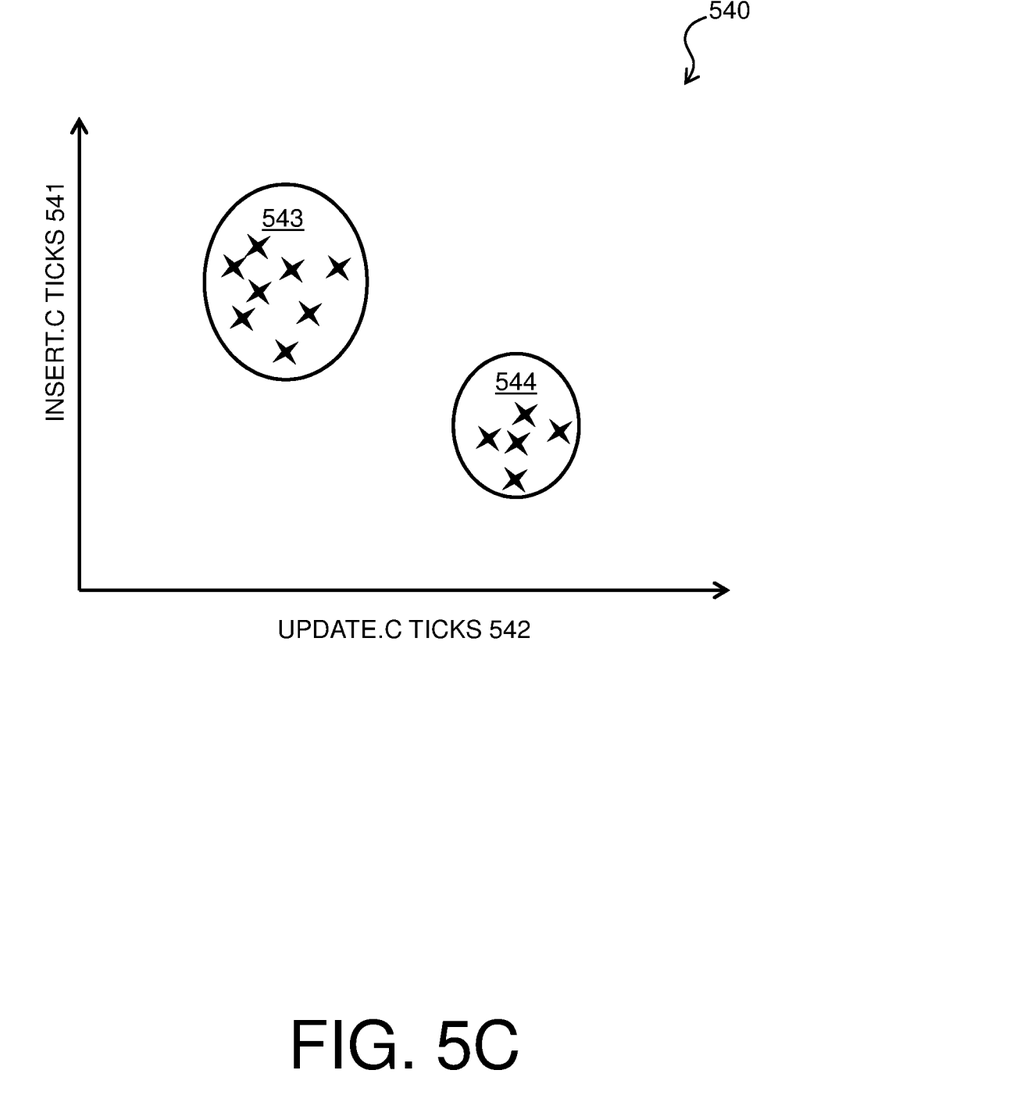
FIG. 5C is a graph of clustering for use in conjunction with embodiments of profile clustering for homogenous instance analysis in accordance with one or more embodiments of the present invention.

FIG. 5C illustrates an embodiment of clustering graph 540 that may be used in conjunction with profile clustering for homogenous instance analysis in accordance with one or more embodiments of the present invention. Any correlations between container performance and hosting environment and/or workload input may be determined based on the clustering. Clustering graph 540 illustrates the relationship between ticks of insert.c (axis 541) and ticks of update.c (axis 542) corresponding to profiling information 500 that was shown in FIG. 5A. Cluster 543 includes a set of containers that have relatively high ticks for insert.c and relatively low ticks for update.c (e.g., may include container C100 of profiling information 500), while cluster 544 includes a set of containers that have relatively low ticks for insert.c and relatively high ticks for update.c (e.g., may include containers C1 and C2 of profiling information 500). Underlying differences between containers in cluster 543 and containers in cluster 544 (e.g., differences in hardware configuration, software configuration, network configuration, and workload) may be analyzed in order to improve container performance.

FIGS. 5A-C are shown for illustrative purposes only. Profiling information, such as is illustrated with respect to FIG. 5A, that may be used in conjunction with embodiments of profile clustering for homogenous instance analysis may include any appropriate information in various embodiments. Maps, such as are illustrated with respect to FIG. 5B, that may be used in conjunction with embodiments of profile clustering for homogenous instance analysis may include any appropriate information in various embodiments. Clustering, such as is illustrated with respect to FIG. 5C, that is performed in conjunction with embodiments of profile clustering for homogenous instance analysis may be performed in any appropriate manner in various embodiments, and may be performed at any level of code unit.

Figure 6:
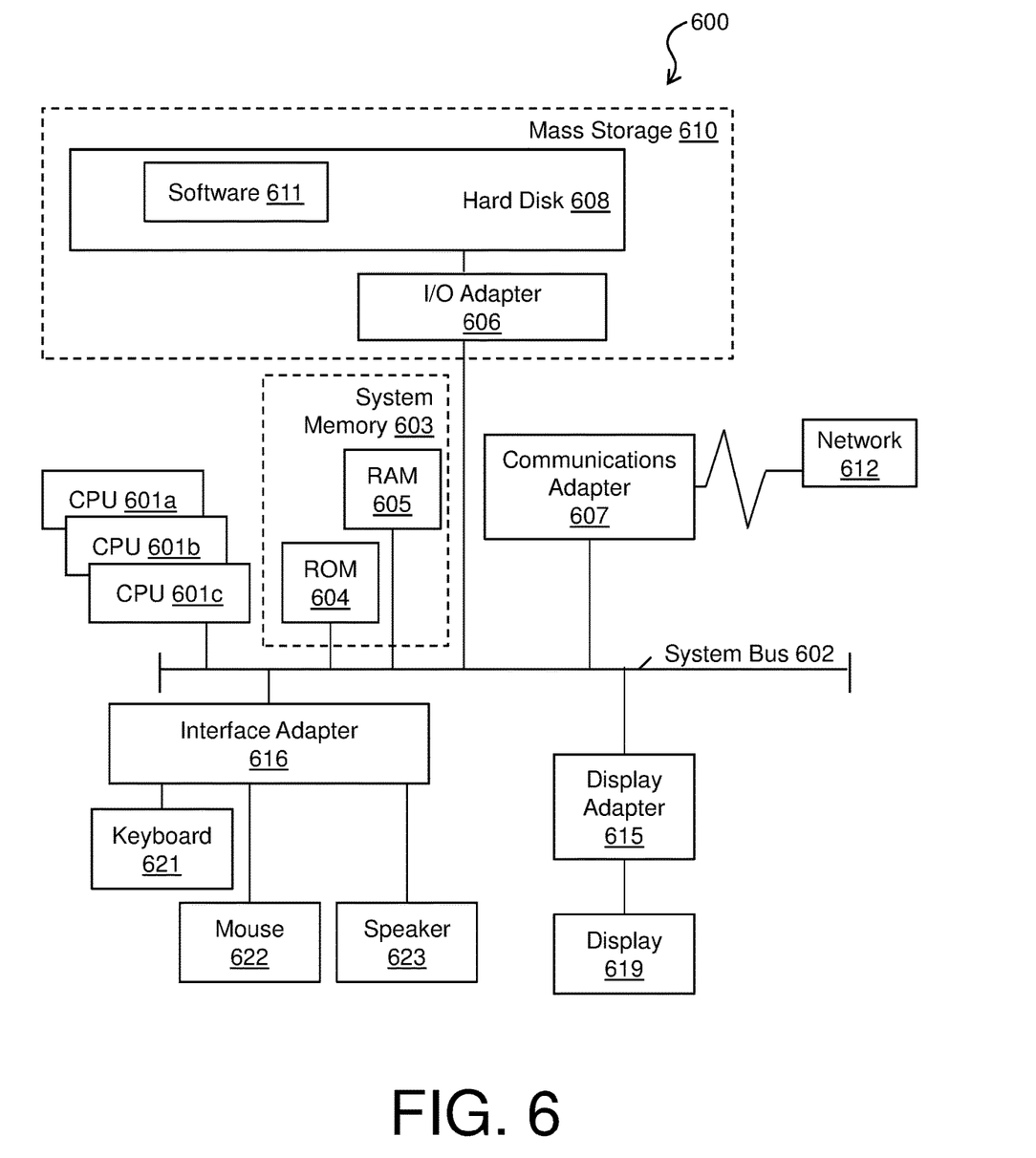
FIG. 6 is a block diagram of an example computer system for use in conjunction with one or more embodiments of profile clustering for homogenous instance analysis.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 1.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    collecting, by a processor, for each of a plurality of homogenous instances in a cloud computing environment, respective profiling information, the profiling information comprising counter data;
    generating a map based on the collected profiling information, wherein the map comprises associations between process identifiers, code modules, and effective address ranges;
    identifying a code unit for analysis;
    aggregating counters corresponding to the code unit for each of the plurality of homogenous instances from the respective profiling information, wherein aggregating the counter data corresponding to the code unit comprises looking up an effective address of sampled code in the code unit, and process identifier of the code unit, in the map; and determining a cluster comprising a subset of the plurality of the plurality of homogenous instances based on the aggregated counters.

2. The method of claim 1, further comprising moving an instance of the plurality of homogenous instances from a first host to a second host in the cloud computing environment based on the determining of the cluster.

3. The method of claim 1, wherein aggregating the counter data corresponding to the code unit comprises:
 determining whether to aggregate counter data by offset;
 based on determining not to aggregate counter data by offset, determining whether the code unit is hierarchical; and
 based on determining that the code unit is hierarchical:
  aggregating the counter data at a plurality of levels associated with the code unit; and
  determining a hotness by object for the code unit based on the aggregated counter data.

4. The method of claim 3, further comprising, based on determining that the code unit is not hierarchical:
 aggregating the counter data corresponding to the code unit at a single level; and
 determining a hotness by object for the code unit based on the aggregated counters.

5. The method of claim 3, further comprising, based on determining to aggregate counter data by offset:
 mapping the effective address to an offset in the code unit;
 aggregating the counter data based on the offset; and
 determining a hotness by line for the code unit based on the aggregated counters.

6. The method of claim 1, wherein the counter data comprises one of ticks and cache misses.

7. A system comprising:
 a memory having computer readable instructions; and
 one or more processors for executing the computer readable instructions, the computer readable instructions controlling the one or more processors to perform operations comprising:
  collecting for each of a plurality of homogenous instances in a cloud computing environment, respective profiling information, the profiling information comprising counter data;
  generating a map based on the collected profiling information, wherein the map comprises associations between process identifiers, code modules, and effective address ranges;
  identifying a code unit for analysis;
  aggregating counters corresponding to the code unit for each of the plurality of homogenous instances from the respective profiling information, wherein aggregating the counter data corresponding to the code unit comprises looking up an effective address of sampled code in the code unit, and process identifier of the code unit, in the map; and
  determining a cluster comprising a subset of the plurality of homogenous instances based on the aggregated counters.

8. The system of claim 7, wherein the counter data comprises one of ticks and cache misses.

9. The system of claim 7, further comprising moving an instance of the plurality of homogenous instances from a first host to a second host in the cloud computing environment based on the determining of the cluster.

10. The system of claim 7, wherein aggregating the counter data corresponding to the code unit comprises:
 determining whether to aggregate counter data by offset;
 based on determining not to aggregate counter data by offset, determining whether the code unit is hierarchical; and
 based on determining that the code unit is hierarchical:
  aggregating the counter data at a plurality of levels associated with the code unit; and
  determining a hotness by object for the code unit based on the aggregated counter data.

11. The system of claim 10, further comprising, based on determining that the code unit is not hierarchical:
 aggregating the counter data corresponding to the code unit at a single level; and
 determining a hotness by object for the code unit based on the aggregated counter data.

12. The system of claim 10, further comprising, based on determining to aggregate counter data by offset:
 mapping the effective address to an offset in the code unit;
 aggregating the counter data based on the offset; and
 determining a hotness by line for the code unit based on the aggregated counter data.

13. A computer program product comprising a computer readable storage medium having program instructions embodied therewith, the program instructions executable by a processor to cause the processor to perform operations comprising:
 collecting for each of a plurality of homogenous instances in a cloud computing environment, respective profiling information, the profiling information comprising counter data;
 generating a map based on the collected profiling information, wherein the map comprises associations between process identifiers, code modules, and effective address ranges;
 identifying a code unit for analysis;
 aggregating counters corresponding to the code unit for each of the plurality of homogenous instances from the respective profiling information, wherein aggregating the counter data corresponding to the code unit comprises looking an effective address of sampled code in the code unit, and process identifier of the code unit, in the map; and
 determining a cluster comprising a subset of the plurality of homogenous instances based on the aggregated counters.

14. The computer program product of claim 13, wherein aggregating the counter data corresponding to the code unit comprises:
 determining whether to aggregate counter data by offset;
 based on determining not to aggregate counter data by offset, determining whether the code unit is hierarchical; and
 based on determining that the code unit is hierarchical:
  aggregating the counter data at a plurality of levels associated with the code unit; and
  determining a hotness by object for the code unit based on the aggregated counters.

15. The computer program product of claim 14, further comprising, based on determining that the code unit is not hierarchical:
 aggregating the counter data corresponding to the code unit at a single level; and
 determining a hotness by object for the code unit based on the aggregated counter data.

16. The computer program product of claim 14, further comprising, based on determining to aggregate counter data by offset:
 mapping the effective address to an offset in the code unit;

aggregating the counter data based on the offset; and
determining a hotness by line for the code unit based on the aggregated counter data.

17. The computer program product of claim 15, wherein the counter data comprises one of ticks and cache misses.

\* \* \* \* \*